US012651320B2

(12) United States Patent
Vyas et al.

(10) Patent No.: US 12,651,320 B2
(45) Date of Patent: Jun. 9, 2026

(54) AIRY-DISK CORRECTION FOR DEBLURRING AN IMAGE

(71) Applicant: Samsung Electronics Co., Ltd., Suwon-si (KR)

(72) Inventors: Kushal Kardam Vyas, Santa Clara, CA (US); Ernest Rehmatulla Post, San Francisco, CA (US); Changgeng Liu, San Jose, CA (US); Gustavo Alejandro Guayaquil Sosa, San Francisco, CA (US); Sajid Sadi, San Jose, CA (US); Nigel Clarke, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 814 days.

(21) Appl. No.: 17/993,483

(22) Filed: Nov. 23, 2022

(65) Prior Publication Data

US 2024/0169497 A1      May 23, 2024

(51) Int. Cl.
G06T 5/73 (2024.01)
G06T 5/70 (2024.01)

(52) U.S. Cl.
CPC ................. G06T 5/73 (2024.01); G06T 5/70 (2024.01); *G06T 2207/10024* (2013.01)

(58) Field of Classification Search
CPC ... G06T 5/73; G06T 5/70; G06T 2207/10024; G06T 2207/20012; G06T 5/20; G06T 5/50; G06T 2207/20021; G06T 2207/20081; G06T 2207/20084; G06T 2207/20182; G06T 3/4053; G06T 7/80;

G06T 2207/20056; G06T 2207/20192; G06T 2207/20201; H04N 23/84; H04N 17/002; H04N 23/81; H04N 25/61; H04N 25/615
See application file for complete search history.

(56) References Cited

U.S. PATENT DOCUMENTS

| | | | |
|---|---|---|---|
| 3,971,065 A | 7/1976 | Bayer | |
| 6,454,414 B1 | 9/2002 | Ting | |
| 7,053,613 B2 | 5/2006 | Lin | |
| 8,041,142 B2 | 10/2011 | Schafer | |
| 8,294,999 B2 | 10/2012 | Alon | |
| 8,433,152 B2 | 4/2013 | Watanabe | |
| 8,582,820 B2 * | 11/2013 | Kane | G06T 5/73 |
| | | | 382/106 |

(Continued)

FOREIGN PATENT DOCUMENTS

| | | |
|---|---|---|
| CN | 101414094 A | 4/2009 |
| CN | 107220945 A | 9/2017 |

(Continued)

OTHER PUBLICATIONS

International Search Report and Written Opinion for International Application No. PCT/KR2023/007313, Aug. 30, 2023.

(Continued)

*Primary Examiner* — Michael S Osinski

(57) ABSTRACT

In one embodiment, a method includes accessing an image captured by an imaging system that includes an aperture and an optical sensor, wherein the imaging system blurs the image; and de-blurring the image by applying an Airy-disk correction that attributes at least part of the blurring in the image to a circular aperture rather than to a pinhole aperture.

20 Claims, 3 Drawing Sheets

(56)  References Cited

U.S. PATENT DOCUMENTS

| | | | |
|---|---|---|---|
| 8,582,911 B2 | 11/2013 | Kim | |
| 8,587,703 B2 | 11/2013 | Lelescu | |
| 8,934,034 B2* | 1/2015 | Nayar | H04N 23/75 |
| | | | 348/277 |
| 9,063,344 B1* | 6/2015 | Griffin | G06T 5/50 |
| 9,142,009 B2* | 9/2015 | Lin | G06T 5/73 |
| 9,220,481 B2 | 12/2015 | Park | |
| 9,338,354 B2 | 5/2016 | Hong | |
| 9,350,977 B1 | 5/2016 | Prasad | |
| 9,582,862 B2 | 2/2017 | Zhang | |
| 9,654,707 B2 | 5/2017 | Oniki | |
| 9,911,208 B2 | 3/2018 | Zhou | |
| 9,916,656 B2 | 3/2018 | Choi | |
| 9,947,901 B2 | 4/2018 | Shedletsky | |
| 9,948,849 B2 | 4/2018 | Kim | |
| 10,032,254 B2 | 7/2018 | Harmeling | |
| 10,062,153 B2 | 8/2018 | Oniki | |
| 10,083,335 B2 | 9/2018 | Zhang | |
| 10,151,933 B2 | 12/2018 | Siddiqui | |
| 10,178,381 B2 | 1/2019 | Hall | |
| 10,191,577 B2 | 1/2019 | Choi | |
| 10,217,190 B2 | 2/2019 | Liu | |
| 10,416,087 B2 | 9/2019 | Zhang | |
| 10,594,932 B2* | 3/2020 | Kim | G06T 3/4053 |
| 10,595,724 B2 | 3/2020 | Lai | |
| 10,642,059 B2 | 5/2020 | Soskind | |
| 10,656,437 B2 | 5/2020 | Limon | |
| 11,003,088 B2 | 5/2021 | Sorg | |
| 11,038,143 B2 | 6/2021 | Moon | |
| 11,073,712 B2 | 7/2021 | Yeke Yazdandoost | |
| 11,272,106 B1 | 3/2022 | Lee | |
| 11,368,617 B2 | 6/2022 | Zhou | |
| 11,575,865 B2 | 2/2023 | Liu | |
| 11,615,510 B2* | 3/2023 | Choi | G06T 5/70 |
| | | | 382/100 |
| 11,721,001 B2 | 8/2023 | Liu | |
| 11,792,515 B2 | 10/2023 | Lee | |
| 11,893,482 B2 | 2/2024 | Zhou | |
| 12,069,381 B2* | 8/2024 | Xu | G06T 5/73 |
| 2003/0002746 A1 | 1/2003 | Kusaka | |
| 2006/0103951 A1 | 5/2006 | Bell | |
| 2006/0256226 A1 | 11/2006 | Alon | |
| 2007/0239417 A1 | 10/2007 | Alon | |
| 2008/0013850 A1 | 1/2008 | Sakurai | |
| 2008/0068660 A1 | 3/2008 | Loce | |
| 2008/0165261 A1 | 7/2008 | Kamo | |
| 2008/0166115 A1 | 7/2008 | Sachs | |
| 2008/0218597 A1 | 9/2008 | Cho | |
| 2008/0292135 A1 | 11/2008 | Schafer | |
| 2009/0147111 A1 | 6/2009 | Litvinov | |
| 2009/0263043 A1 | 10/2009 | Cristobal | |
| 2010/0073518 A1 | 3/2010 | Yeh | |
| 2010/0188528 A1 | 7/2010 | Iwata | |
| 2011/0019056 A1 | 1/2011 | Hirsch | |
| 2011/0075257 A1 | 3/2011 | Hua | |
| 2011/0158541 A1 | 6/2011 | Watanabe | |
| 2011/0221888 A1* | 9/2011 | Choi | G01C 3/08 |
| | | | 348/E5.025 |
| 2011/0285680 A1 | 11/2011 | Nakamura | |
| 2012/0057072 A1 | 3/2012 | Yamashita | |
| 2012/0162490 A1 | 6/2012 | Chung | |
| 2012/0327277 A1 | 12/2012 | Myhrvold | |
| 2013/0002932 A1 | 1/2013 | Guenter | |
| 2013/0010077 A1 | 1/2013 | Nguyen | |
| 2013/0147778 A1 | 6/2013 | Ninan | |
| 2013/0170765 A1* | 7/2013 | Santos | G06T 5/73 |
| | | | 382/255 |
| 2013/0182062 A1 | 7/2013 | Son | |
| 2013/0308007 A1* | 11/2013 | Tanaka | H04N 25/615 |
| | | | 348/222.1 |
| 2013/0321686 A1 | 12/2013 | Tan | |
| 2013/0336597 A1 | 12/2013 | Maeda | |
| 2014/0044314 A1 | 2/2014 | Sezer | |
| 2015/0036943 A1* | 2/2015 | Lin | G06T 5/73 |
| | | | 382/254 |
| 2015/0049165 A1 | 2/2015 | Choi | |
| 2015/0101411 A1 | 4/2015 | Zalev | |
| 2015/0207962 A1 | 7/2015 | Sugimoto | |
| 2015/0269434 A1 | 9/2015 | Aliaga | |
| 2015/0338639 A1 | 11/2015 | Mtsumoto | |
| 2016/0062100 A1 | 3/2016 | Cohen | |
| 2016/0110851 A1* | 4/2016 | Oniki | G06T 5/20 |
| | | | 348/241 |
| 2016/0180510 A1 | 6/2016 | Grau | |
| 2016/0248975 A1 | 8/2016 | Choi | |
| 2016/0277658 A1 | 9/2016 | Kim | |
| 2016/0371821 A1 | 12/2016 | Hayashi | |
| 2017/0076430 A1 | 3/2017 | Xu | |
| 2017/0104897 A1 | 4/2017 | Kang | |
| 2017/0212613 A1 | 7/2017 | Hwang | |
| 2017/0316552 A1 | 11/2017 | Hanocka | |
| 2018/0038768 A1 | 2/2018 | Hofmann | |
| 2018/0052050 A1 | 2/2018 | Menon | |
| 2018/0116500 A1 | 5/2018 | Escalier | |
| 2018/0129061 A1 | 5/2018 | Shinohara | |
| 2018/0198980 A1 | 7/2018 | Takagi | |
| 2018/0211420 A1 | 7/2018 | Yoo | |
| 2019/0212544 A1 | 7/2019 | Heber | |
| 2019/0213716 A1* | 7/2019 | Oniki | G06T 5/20 |
| 2019/0213717 A1 | 7/2019 | Oniki | |
| 2019/0327417 A1 | 10/2019 | Moriuchi | |
| 2019/0355101 A1 | 11/2019 | Chen | |
| 2020/0159102 A1 | 5/2020 | Kouyama | |
| 2020/0166807 A1 | 5/2020 | Sasaki | |
| 2020/0169725 A1 | 5/2020 | Hua | |
| 2020/0209604 A1 | 7/2020 | Chen | |
| 2020/0321561 A1 | 10/2020 | Park | |
| 2020/0389575 A1 | 12/2020 | Gove | |
| 2020/0394964 A1 | 12/2020 | Hyun | |
| 2021/0029336 A1* | 1/2021 | Liu | H04N 23/84 |
| 2021/0136335 A1 | 5/2021 | Tanaka | |
| 2021/0152735 A1 | 5/2021 | Zhou | |
| 2021/0193756 A1 | 6/2021 | Oh | |
| 2021/0199952 A1 | 7/2021 | Cho | |
| 2021/0210533 A1 | 7/2021 | Cho | |
| 2021/0233976 A1 | 7/2021 | Lee | |
| 2021/0302316 A1 | 9/2021 | Walter | |
| 2022/0060681 A1* | 2/2022 | Stec | H04N 17/002 |
| 2022/0067889 A1 | 3/2022 | Kang | |
| 2022/0086309 A1 | 3/2022 | Kim | |
| 2022/0138924 A1 | 5/2022 | Kwon | |
| 2022/0165052 A1* | 5/2022 | Gan | G06V 10/774 |
| 2022/0261966 A1 | 8/2022 | Liu | |
| 2022/0277426 A1 | 9/2022 | Vyas | |
| 2022/0292637 A1 | 9/2022 | Huang | |
| 2022/0398698 A1 | 12/2022 | Li | |
| 2022/0405892 A1* | 12/2022 | Kusumi | G06T 5/73 |
| 2023/0053084 A1 | 2/2023 | Xu | |
| 2023/0341264 A1 | 10/2023 | Houck | |
| 2024/0013350 A1* | 1/2024 | Delbracio | G06T 5/73 |
| 2024/0323548 A1* | 9/2024 | Sun | G06T 5/60 |

FOREIGN PATENT DOCUMENTS

| | | | |
|---|---|---|---|
| CN | 111 681 560 A | 9/2020 | |
| CN | 112202991 A | 1/2021 | |
| CN | 113 053 253 A | 6/2021 | |
| CN | 113 067 961 A | 7/2021 | |
| CN | 108335268 B | 9/2021 | |
| CN | 114331886 A | 4/2022 | |
| CN | 110675347 B | 5/2022 | |
| JP | 2008-070566 A | 3/2008 | |
| JP | 2019-068378 A | 4/2019 | |
| JP | 6652052 B9 | 2/2020 | |
| KR | 101894391 B1 | 9/2018 | |
| KR | 10-2022-0014764 A | 2/2022 | |
| WO | WO 2010081229 A1 | 7/2010 | |
| WO | WO 2016-154392 A1 | 9/2016 | |
| WO | WO 2017117152 A1 | 7/2017 | |
| WO | WO 2021/122471 A1 | 6/2021 | |
| WO | WO 2022-005157 A1 | 1/2022 | |

(56)            References Cited

FOREIGN PATENT DOCUMENTS

OTHER PUBLICATIONS

Notice of Allowance in U.S. Appl. No. 17/176,535, Mar. 8, 2023.
Levin, A. et al., "Image and Depth from a Conventional Camera with a Coded Aperture," ACM Transactions on Graphics, vol. 26, No. 3, Article 70, Publication date Jul. 2007, DOI 10.1145/1239451.1239952, http://doi.acm.org/10.1145/1239451.1239521, 9 pgs.
Hong, J., et al., "Three-dimensional display technologies of recent interest: principles, status, and issues [Invited]," (Doc. ID 152226), Applied Optics, vol. 50, No. 34, , Dec. 1, 2011, https://www.researchgate.net/publication/51919272, DOI: 10.1364/AO.50.000H87, 0003-6935/11/340H87, © 2011 Optical Society of America, pp. H87-H115 (30 pages).
Ren, Ng, "Digital light field photography," PhD dissertation, Stanford University, Jul. 2006, 203 pgs.
Qin, Zong, et al., "See-Through Image Blurring of Transparent Organic Light-Emitting Diodes Display: Calculation Method Based on Diffraction and Analysis of Pixel Structures," Journal of Display Technology, vol. 12, No. 11, Nov. 2016, Digital Object Identifier 10.1109/JDT.2016.2594815, 1551-319X © 2016 IEEE, pp. 1242-1249 (9 pgs).
Richardson, William Hadley, "Bayesian-Based Iterative Method of Image Restoration," Journal of Optical Society of America, vol. 62, No. 1, Jan. 1972, pp. 55-59 (5 pgs).
Lucy, L. B., "An Iterative Technique for the Rectification of Observed Distributions," The Astronomical Journal, vol. 79, No. 6, Jun. 1974, CAmerican Astronomical Society, provided by the NASA Astrophysics Data System, pp. 745-754 (10 pgs).
Heide, Felix, et al., "ProxImaL: Efficient Image Optimization Using Proximal Algorithms," SIGGRAPH 16 Technical paper, Jul. 24-28, 2016, Anaheim, CA. SIGGRAPH '16 Technical Paper, Jul. 24-28, 2016, Anaheim, CA, ISBN: 978-1-4503-4279-7/16/07 DOI: http://dx.doi.org/10.1145/2897824.2925875, 15 pages.
Sitzmann, Vincent., et al., "End-to-End Optimization of Optics and Image Processing for Achromatic Extended Depth of Field and Super-Resolution Imaging," © 2018 ACM 0730-0301/2018/8-ART114, https://doi.org/10.1145/3197517.3201333, ACM Transactions on Graphics vol. 37, No. 4, Article 114, Publication Aug. 2018, pp. 114:1-114:13 (13 pgs.).
International Search Report and Written Opinion for International Application No. PCT/KR2020/009807, Oct. 26, 2020.
European Search Report in EP 20846484.2, Mar. 14, 2022.
Non-Final Office Action in U.S. Appl. No. 16/935,946, Apr. 5, 2022.
Notice of Allowance in U.S. Appl. No. 16/935,946, Jul. 6, 2022.
Notice of Allowance in U.S. Appl. No. 16/935,946, Sep. 30, 2022.
PCT Search Report and Written Opinion in PCT/KR2022/015641, Jan. 26, 2023.
Yang, Hang, Zhongbo Zhang, and Yujing Guan. "An adaptive parameter estimation for guided filter based image deconvolution." *Signal Processing* 138 (Mar. 7, 2017): 16-26.
Youmaran, R., and A. Adler. "Combining regularization frameworks for image deblurring: optimization of combined hyper-parameters." In *Canadian Conference on Electrical and Computer Engineering 2004 (IEEE Cat. No. 04CH37513)*, vol. 2, pp. 723-726. IEEE, May 2, 2004.
Non-Final Office Action in U.S. Appl. No. 17/380,995, Jun. 22, 2022.

PCT Search Report and written decision in PCT/KR2022/001024, May 10, 2022.
Notice of Allowance in U.S. Appl. No. 17/380,995, Dec. 21, 2022.
Notice of Allowance in U.S. Appl. No. 17/963,609, Aug. 28, 2024.
PCT Search Report and Written Decision in PCT/KR2022/001920, May 13, 2022.
Non-Final Office Action in U.S. Appl. No. 17/176,535, Aug. 16, 2022.
Final Office Action in U.S. Appl. No. 17/176,535, Nov. 7, 2022.
Soldevila F et al: "Phase imaging by spatial wavefront sampling", arxiv.org, Cornell University Library, 201 Olin Library Cornell University Ithaca, NY 14853, Nov. 11, 2017 (Nov. 11, 2017), XP081287443, DOI: 10.1364/OPTICA.5.000164.
Katkovnik Vladimir et al: "A novel binary and multilevel phase masks for enhanced depth-of-focus infrared imaging", 2018 52nd Asilomar Conference On Signals, Systems, and Computers, IEEE, Oct. 28, 2018 (Oct. 28, 2018), pp. 386-390, XP033520926, DOI: 10.1109/ACSSC.2018.8645129.
European Patent Office Extended European Search Report in Application No. 22881419.0-1207/4327058 PCT/KR2022015641, Sep. 19, 2024.
Anqi Yang et al., 'Designing Display Pixel Layouts for Under-Panel Cameras', IEEE Transactions on Pattern Analysis and Machine Intelligence, vol. 43, No. 7, pp. 2245-2256, Apr. 27, 2021.
PCT Search Report and Written Decision in PCT/KR2022/011598, Nov. 16, 2022.
Extended European Search Report in Application No. 22853505.0-1211 / 4363929 PCT/KR2022011598, Dec. 18, 2024.
Lin Rong Jie et al.: "An Optimized Algorithm to Reconstruct the Structure of Transparent OLED Display Based on Monte Carlo Method", SID Symposium Digest of Technical Papers, vol. 51, No. 1, Aug. 1, 2020, pp. 2009-2012, XP093230962, US ISSN:0097-966X, DOI: 10.1002/sdtp.14309.
Notice of Allowance in U.S. Appl. No. 17/993,357, Jul. 7, 2025.
Non-final office action in U.S. Appl. No. 17/993,357, Feb. 12, 2025.
International Search Report and Written Opinion for International Application No. PCT/KR2023/017304, Feb. 2, 2024.
Yangjie Wei et al., Blurring kernel extraction and super-resolution image reconstruction based on style generative adersarial networks, Optics Express vol. 29, Issue 26, Dec. 16, 2021.
Eric Yang, Variable Synthetic Depth of Field with Mobile Stereo Cameras, Computer Science Engineering, https://stanford.edu/class/ee367/sections 3.2, 4.3; 2020, retrieved on Jan. 9, 2024.
Non-final Office Action in U.S. Appl. No. 17/963,609, Mar. 27, 2024.
Notice of Allowance in U.S. Appl. No. 17/745,693, Mar. 26, 2025.
Oppo's under-screen camera is real and taking photos in Shanghai accessed on Oct. 25, 2022 at https://www.engadget.com/2019-06-26-oppo-under-screen-camera-mwc-shanghai.html.
Image Restoration for Under-Display Camera, Yuqian Zhou et al., CVPR 2021, accessed on Oct. 25, 2022 at https://openaccess.thecvf.com/CVPR2021?da=all.
Extended European Search Report in Application No. 23894860.8 / 4584747 PCT / KR2023017304, Nov. 20, 2025.
Raveh I et al: "Digital Method for Defocus Corrections: Experimental Results"; Optical Engineering, Society of Photo-optical instrumnetation engineers, DOI:10.1117/1.602215, Oct. 1, 1999.
Zhou Luoyu et al: "Blind Deblurring Based on a Single Luminance Channel and L1-Norm"; IEEE Access; DOI:10.1109/ACCESS.2021.3112491, Sep. 13, 2021.

* cited by examiner

Accessing an image captured by an imaging system comprising an aperture and an optical sensor, wherein the imaging system blurs the image
110

De-blurring the image by applying an Airy-disk correction that attributes at least part of the blurring in the image to a circular aperture rather than to a pinhole aperture
120

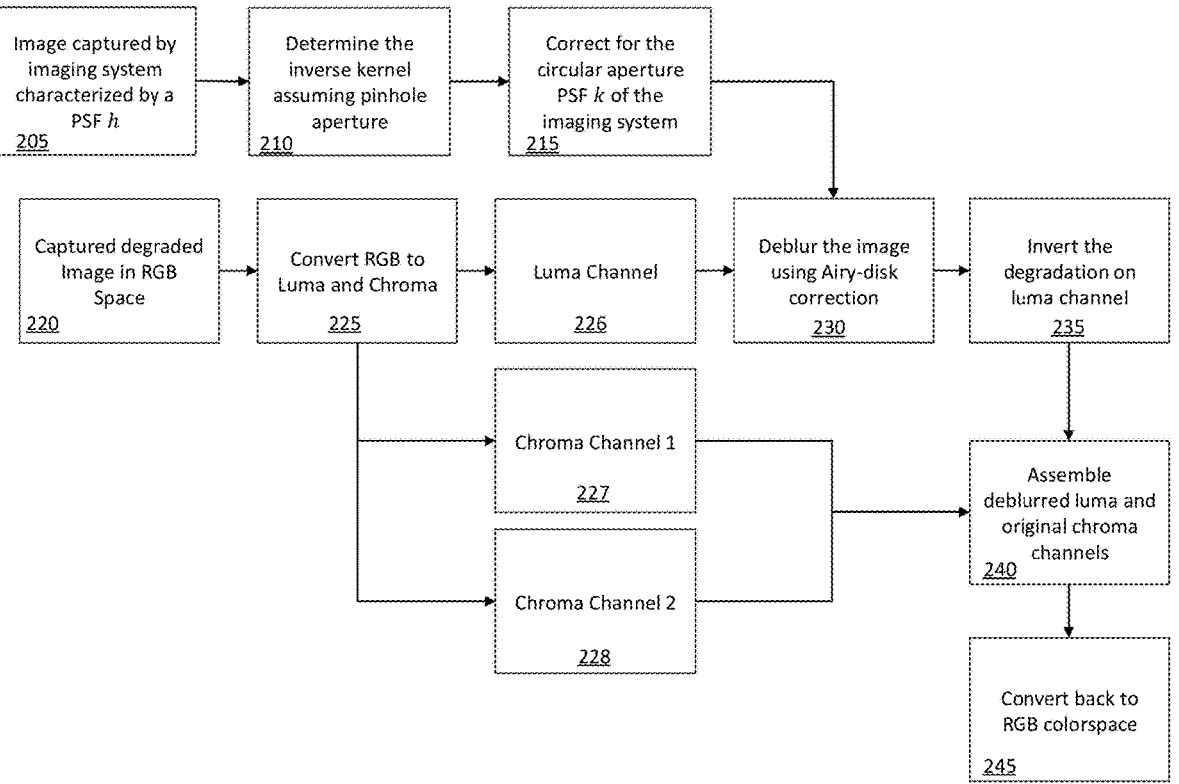

Image captured by imaging system characterized by a PSF $h$
205

Determine the inverse kernel assuming pinhole aperture
210

Correct for the circular aperture PSF $k$ of the imaging system
215

Captured degraded Image in RGB Space
220

Convert RGB to Luma and Chroma
225

Luma Channel
226

Deblur the image using Airy-disk correction
230

Invert the degradation on luma channel
235

Chroma Channel 1
227

Chroma Channel 2
228

Assemble deblurred luma and original chroma channels
240

Convert back to RGB colorspace
245

Fig. 2

AIRY-DISK CORRECTION FOR DEBLURRING AN IMAGE

TECHNICAL FIELD

This application generally relates to an Airy-disk correction for deblurring images.

BACKGROUND

Electronic devices, such as mobile phones, tablet computers, smartwatches, and so forth, often include one or more image sensors, such as a camera, that can capture images. For example, a personal electronic device may include one or more cameras on the rear, or back, of the device; may include one or more cameras on the front of the device; and may include one or more cameras oriented in other arrangements on the device.

An image taken by a camera, such as by a camera (e.g., under-display camera (UDC)) of an electronic device, may be degraded (e.g., blurred) relative to the scene captured by the image due to a number of factors, such as interactions, obstructions, etc., that occur as light from the scene travels to the camera's sensor that captures the image. In some cases, degradation may be determined or represented by point-spread functions (PSFs) that describe the response of the camera's imaging system to a point source of light, and a PSF can be representative of an amount of blurring that is present in an image of a point source. Hence, given a degraded measurement, the process of obtaining a reconstruction of an ideal/good/clean latent image (which may be referred to as the deblurred image) can be set up as solving an inverse problem. For instance, a PSF may be used to reconstruct a latent/un-degraded, or de-blurred, image via non-blind deconvolution, following the setup of an inverse problem, which also may be referred to as "inverse filtering."

BRIEF DESCRIPTION OF THE DRAWINGS

FIG. 2 illustrates an example deblurring procedure.

DESCRIPTION OF EXAMPLE EMBODIMENTS

An image captured through a camera sensor is subject to blurring or degradation due to, e.g., corruption and noise, and the blurring function is often represented by one or more PSFs, which characterize the optical response of an optical system. For example, if a camera is disposed under a display of a device, then the display structure may interfere with the light from a scene as it passes through the display, resulting in a blurred image output by the under-display camera's optical sensor. Undoing blurring in an image can be called an inverse problem, which refers to recovering a clean/latent image from a blurred image by using an inverse filter.

An optical system, such as a camera, typically includes several components. For example, a camera can include an aperture, which is an opening through which light from a scene is permitted to pass. After the aperture may be a lens, which focuses the light passing through the aperture onto a sensor. The sensor detects the focused light and outputs corresponding signals (e.g., electrical signals) that are used to create an image of the scene. The description above represents a simplified example of the components of a general optical system, and this disclosure recognizes that an optical system may include additional components or more than one of the components (e.g., lens or sensors) described above.

When deblurring an image, the aperture of an optical system is often approximated as a pinhole. However, in many optical systems, such as for example modern smartphone cameras, the aperture is not a pinhole but is instead a circular opening that is bigger than a pinhole (e.g., may be 1 cm in diameter). The optical response of a circular opening is different than that of a pinhole; for example, in general the response of pinhole is idealized as a delta function, while the response of a circular opening is an Airy disk with a width that increases as a function of the radius of the circular opening. Thus, when deblurring an image captured by an optical system having a circular aperture but that is approximated as a pinhole, the approximation will result in artifacts (e.g., graininess, erroneous sharpness, amplified noise, etc.) in the deblurred image as a result of the mismatch between the actual aperture, and its corresponding optical response, and the approximation.

Figure 1:
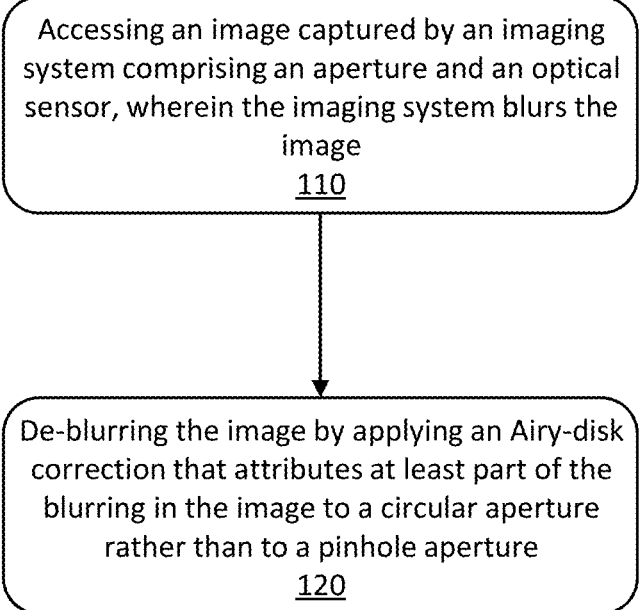
FIG. 1 illustrates an example method of improved deblurring of an image captured by an optical system that includes an aperture that is better represented as a circular aperture than a pinhole aperture.

FIG. 1 illustrates an example method of improved deblurring of an image captured by an optical system that includes an aperture that is better represented as a circular aperture than a pinhole aperture. For example, the aperture may be circular or approximately circular and larger than a pinhole, and thus the example method of FIG. 1 results in improved deblurring relative to deblurring that only approximates the aperture as a pinhole.

Step 110 of the method of FIG. 1 includes accessing an image captured by an imaging system that includes an aperture and an optical sensor, wherein the imaging system blurs the image. As explained above, the imaging system may include additional components, such as a lens. In particular embodiments, accessing an image may include capturing an image, e.g., by the optical sensor of the optical sensor. In particular embodiments, step 110 may be performed on a computing device that includes the optical system. For example, a client device such as a smartphone, TV, laptop, etc. may include a camera and computing hardware and memory, and step 110 may be performed by the computing device. In particular embodiment, step 110 may be performed on a different computing device than the device that captured the image. For example, step 110 may be performed by a server computing device, or by a client computing device (e.g., a personal computer, etc.) to de-blur an image capture by another device (e.g., a camera or a smartphone, etc.).

Step 120 of the example method of FIG. 1 includes de-blurring the image by applying an Airy-disk correction that attributes at least part of the blurring in the image to a circular aperture rather than to a pinhole aperture. For example, step 120 may include modifying an inverse filter to address the non-pinhole nature of the aperture and deblur a degraded image captured by an optical system. As explained above, the optical system may have a circular or approximately circulate aperture. The inverse filter may, for example, be a regularized inverse filter, for example as described below. However, this disclosure is not limited to implementing an Airy-disk correction using the methodology of a regularized inverse filter.

As an example of the regularized inverse-filter approach, given an acquired blurry image g with known point spread function (PSF) of the optical system h, particular embodiments reconstruct the latent (deblurred) image f, which may be referred to as the inverse problem. Therefore, g is the blurred image; h is the measured/estimated PSF of the imaging system; f is the latent deblurred image to be reconstructed; and λ is a regularization parameter. We may then write the regularized inverse filter as a constrained optimization problem:

$$\underset{f}{\arg\min} \sum_{i,j} \left|g_{ij} - (h*f)_{ij}\right|^2 + \lambda \sum_{i,j} \left|(p*f)_{ij}\right|^2 \quad (1)$$

$$\text{subject to} \sum_{i,j} \left|g_{ij} - (h*f)_{ij}\right|^2 = \eta, \quad (2)$$

where * denotes convolution, i and j are row and column indices over the image(s), η is an estimate of total noise in the captured image g, and p is a filter kernel which appears in the regularization term of Eqn. (1) to enforce smoothness of the solution f. For concreteness, here we take p to be the discrete Laplacian operator:

$$p = \begin{bmatrix} 0 & 1 & 0 \\ 1 & -4 & 1 \\ 0 & 1 & 0 \end{bmatrix} \quad (3)$$

According to Parseval's theorem, Eqn. (1) is equivalent to the following expression, where G, H, and F are the Fourier transforms of g, h, and f, while P is the Fourier transform of the filter kernel p after zero-padding to the same size as g, h, and f:

$$F^* = \underset{F}{\arg\min} \sum_{i,j} |G_{ij} - H_{ij}F_{ij}|^2 + \lambda|P_{ij}F_{ij}|^2 \quad (4)$$

To find the solution F*, we can substitute F=WG and factor out G to obtain $$W^* = \underset{W}{\arg\min} \sum_{i,j} |G_{ij}|^2 \left[|1 - H_{ij}W_{ij}|^2 + \lambda|P_{ij}W_{ij}|^2\right] \quad (5)$$

The description below omits the indices i, j for readability.

A solution can found by setting the derivative of the RHS of (5) to zero for all terms:

$$\frac{\partial}{\partial W} |G|^2 \left[1 - 2HW + \left(|H|^2 + \lambda|P|^2\right)|W|^2\right] = \quad (6)$$

$$G^2\left[-2H + 2\left(|H|^2 + \lambda|P|^2\right)W^*\right] = 0$$

This equality can be rearranged to obtain an expression for F:

$$\left(|H|^2 + \lambda|P|^2\right)W^* = H \Rightarrow W = \frac{H^*}{|H|^2 + \lambda|P|^2} \quad (7)$$

$$F = WG = \frac{H^*G}{|H|^2 + \lambda|P|^2}$$

where F is the result we seek (the deblurred image), G is the input (blurred) image, and W is the inverse filter, all in the Fourier domain. Because H, P, and G are all known, the only parameter remaining to be found is λ.

Determining the parameter λ for optimal reconstruction requires solving the related optimization problem. By convention, the optimal value of λ is called λ* and is determined by $$\lambda^* = \underset{\lambda}{\arg\min} \sum_{i,j} \left| |G_{ij}|^2 \frac{\lambda^2|P_{ij}|^4}{\left(|H_{ij}|^2 + \lambda|P_{ij}|^2\right)^2} - \eta \right| \quad (8)$$

On solving the λ*, we can plug the value of λ* back in equation (7) to compute the inverse kernel which is used to obtain the latent deblurred image.

However, as explained above, computing the inverse of just the point-spread function yields a restored/latent deblurred image that may be overly sharp and have artifacts due to the fact that the PSF approximates the aperture as a pinhole. To correct for the fact that an image is captured from a circular or approximately circular aperture imaging system, particular embodiments determine a corresponding inverse kernel that is then used in Equation (7). For example, particular embodiments of the method of FIG. 1 may compute the inverse kernel assuming pinhole aperture and then correct for the circular aperture/Airy-disk PSF k of the optical system. Then, embodiments may use the regularized inverse filter methodology or other suitable methodology to invert degradation, resulting in a deblurred image that treats the aperture of the optical system capturing the image as circular. This disclosure contemplates that the regularized inverse filter approach, which uses the regularization parameter λ, is just one example approach for deblurring an image, and the techniques of this disclosure may be used in a variety of approaches for deblurring an image by treating an aperture as circular. For example, a deep-learning model, such as a neural network, may be used to estimate an inverse kernel in an end-to-end fashion without having to determine explicitly, a value of λ.

As explained above, given a degraded/blurred captured image g through an imaging system characterized by a point spread function h, embodiments solve for the latent deblurred image denoted by f. If the optical system is treated as a circular aperture system with an Airy-disk point spread function denoted by k, then the captured image may be denoted by ĝ, and the latent image is denoted by f̂.

Provided that sensor noise is negligible, as is typically the case (for example, because the imaging pipeline hardware or software has accounted for sensor noise, e.g., through camera calibration), then:

$$g = h*f \quad (9)$$

$$\hat{g} = k*\hat{f} \quad (10)$$

Here, f is the same as f̂, and ĝ would be the image that is obtained by the Airy-disk point spread function corresponding to a circular aperture, which in this example the Airy-disk correction of method of FIG. 1.

By applying a Fourier transform (DFT/FFT) such that a convolution in the spatial domain turns into elementwise multiplication in the Fourier domain, the operations described below refer to the Fourier space domain. To denote the shift of domain, we switch to capital letters in the nomenclature.

$$G = HF \quad (11)$$

$$\hat{G} = K\hat{F} \quad (12)$$

As explained above, the desired latent/deblurred image should appear as if it was captured from a circular aperture i.e., $\hat{g}$. Particular embodiments measure or precompute the values of h, k—i.e., the point spread function of the blur/ degradation as well as the point spread function of the circular aperture. The following illustrates the corrected inverse kernel in the Fourier space:

$$G=HF \tag{13}$$

$$\hat{G}=K\hat{F} \tag{14}$$

Since F==$\hat{F}$, we write the equation as:

$$\hat{G}=KH^{-1}G \tag{15}$$

where here the inverse sign to signify the inverse-kernel associated to that optical system, e.g., as indicated by the term W in equation (7), not the matrix inverse. Then:

$$\hat{G}=(KH^{-1})G \tag{16}$$

where $(KH^{-1})$ is the updated inverse kernel.

In an embodiment where a regularized inverse filter approach is used to deblur an image, then we plug the formulation of the updated inverse kernel into Equation (7) and obtain the following solution. As we can see, previously Equation (7) provided a latent image through a pinhole, whereas the current solution provides a latent image as seen through a circular aperture, e.g., as present in modern smartphones.

$$\hat{G} = \frac{(H^*K)G}{|H|^2 + \lambda |P|^2} \tag{17}$$

Thus, these embodiments recover the latent/deblurred image $\hat{G}$ as seen from an optical system of an apparatus, such as a smartphone, having a circular aperture, given the blurry captured image G. Particular embodiments may solve for the parameter $\lambda$ as shown in equation (8) by using an optimal value of $\lambda$, denoted by $\lambda^*$ and discussed more fully above.

The resulting deblurring improves image quality, for example by reducing the erroneous oversharpness of edges between objects in the image that are introduced by incorrectly modeling the aperture of the optical system as a pinhole. Moreover, in addition to improved image quality, the techniques discussed herein also improve computational-resource utilization because the improved deblurring is obtained during the deblurring process, without requiring an additional denoising and/or smoothing process that often takes substantial resources to perform.

In particular embodiments, deconvolution operates on each of the three channels of an RGB image, i.e., a PSF for each color channel is used to deblur the image. However, particular embodiments can obtain an improved computational runtime for image deblurring by operating on only a single luminance channel, achieving the same or similar image reconstruction quality but providing up to a threefold improvement in deblurring time by reducing the number of channels used to deblur an image.

An image captured in RGB colorspace has 3 channels corresponding to red, green and blue. However, an image may be represented using a luminance/chrominance representation. For example, YUV colorspace may be used to represent an image, and other examples include YCbCr, LAB, etc. While embodiment of this disclosure refer to YUV as an example, this disclosure contemplates that any suitable luminance/chrominance representation may be used.

Luminance refers generally to the brightness information of an image, and chrominance refers to the color/chromatic information of the image. A luminance channel for a given image has more detail and is higher resolution than a chrominance channel, which typically are more redundant and therefore more compressible. For example, a luminance channel typically contains information about the edges or transitions between objects in an image, and a chrominance channel may be about ¼ the size of a luminance channel. Similar to chrominance channels, RGB channels are typically highly correlated with each.

FIG. 2 illustrates an example deblurring procedure that contains an Airy-disk correction that is applied only to a luminance channel. Step 205 of the example procedure of FIG. 2 includes accessing an image captured by imaging system that is characterized by a PSF h. Step 210 includes determining the inverse kernel, assuming a pinhole aperture of the imaging system. Step 215 includes applying a correction for a circular aperture, for example as explained more fully above in connection with the example of FIG. 1. Step 205-215 may be performed, for example, as part of a device calibration, for example before the device is distributed to a user.

As illustrated in the example of FIG. 2, in step 220 a particular image may be captured by the imagining system. In the example of FIG. 2, the captured image is in a blurred, or degraded, RGB colorspace. Step 225 includes converting the RGB image to a luminance/chrominance space. Then, steps 226, 227, and 228 include separating the image into a high-fidelity luminance channel and two lower fidelity chrominance channels. Steps 230 and 235 includes using the circular-aperture correction obtained in step 215 to deblur only the luminance channel. Step 240 includes reassembling the deblurred luminance channel and the original chrominance channels and then converting, in step 245, the image back to an RGB colorspace. The resulting image is then a de-blurred, corrected image.

Particular embodiments may determine, such as by empirically determining, whether to apply a correction to only a luminance channel, or whether deblurring should be applied to multiple channels (e.g., to each of the three RGB channels). For example, a determination may be that either (1) the point spread functions of the system for all the color channels is equivalent; or (2) the point spread function of the system for all color channels are similar and there are not significant artifacts or loss of image quality in the recovered image. In response to this determination, i.e., that either (1) and (2) are true, then deblurring may be applied on only a chrominance channel. In response to a determination that neither (1) or (2) above apply, then deblurring may be applied on multiple channels, such as for example on each of the three RGB channels. Thus, in the latter embodiments, an RGB image may not be converted to luminance/chrominance channels, and step 230 may instead be applied to each of three RGB channels.

In particular embodiments, the point spread function can be equivalent across the red, green, and blue image channels when a point source of light for a particular color channel (associated wavelength) results in a similar or identical (i.e., substantially identical) spread as the other color channels (associated wavelengths)—a result of which can be observed when the edges in a reconstructed image (post deconvolution) do not exhibit bleeding, e.g., the locations of the edges (edges between objects in the image) in an image corresponding to each channel line up with each other on a per-pixel basis. In particular embodiments, determining whether the PSF for each of the plurality of color channels are similar to each other and there are no significant artifacts or loss of image quality in the recovered image may include determining that bleeding is not present, and/or that peak SNR is not very low.

In order to deconvolve a luminance channel of the degraded image, particular embodiments may use the luminance channel of the PSF (e.g., by converting the RGB PSF into a YUV PSF). For example, particular embodiments may convert the RGB PSF into a YUV PSF and use its luminance channel when the PSF is equivalent or sufficiently similar in R, G, B. In the alternative, particular embodiments may deconvolve the luminance channel of the degraded image by using the green channel of the PSF, since the green channel is the major component of luminance in the YUV formulation. Thus, in particular embodiments the green channel of the PSF may be used to approximate the luminance channel of the PSF, and the green channel of the PSF may therefore be used to deconvolve the luminance channel of the captured image, e.g., as in steps 230 and 235 of the example of FIG. 2. Particular embodiments may use these approximations to attain a computational speed-up.

In particular embodiments, deblurring may be applied in real-time to a series of images, e.g., as in a video. For example, in a regularized inverse filter approach, $\lambda^*$ may be determined, e.g., as described in U.S. Patent Application Publication No. 2022/0277426, the entirety of which is incorporated herein by reference, and this $\lambda^*$ may be used to determine the inverse kernel of the Airy-disk correction. The correction may be applied to video, for example to video obtained by a smartphone having a camera disposed under the display of the smartphone. Video is often represented as YUV, and therefore when the PSFs for a given frame of the video are equivalent or sufficiently similar across RGB color channels, particular embodiments can deconvolve the luminance channel only, thus providing improved computational runtime, as discussed above.

Some imaging systems have a dynamic aperture, meaning that the size of the aperture can dynamically change. In these instances, embodiments can vary the Airy-disk correction applied to an image captured by the optical system in accordance with the size of the aperture used to capture the image. For example, a system may compute or pre-calculate the PSF of the aperture at various size of the aperture, or at a single size of the aperture and then scale the PSF accordingly based on the fact that the Airy-disk optical response of the aperture varies as a function of the radius of the aperture's size.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, such as the computer system of FIG. 3, this disclosure contemplates any suitable combination of any suitable components, devices, or systems carrying out any suitable steps of the method of FIG. 1. Moreover, this disclosure contemplates that some or all of the computing operations described herein, including the steps of the example method illustrated in FIG. 1, may be performed by circuitry of a computing device, for example the computing device of FIG. 3, by a processor coupled to non-transitory computer readable storage media, or any suitable combination thereof.

Figure 3:
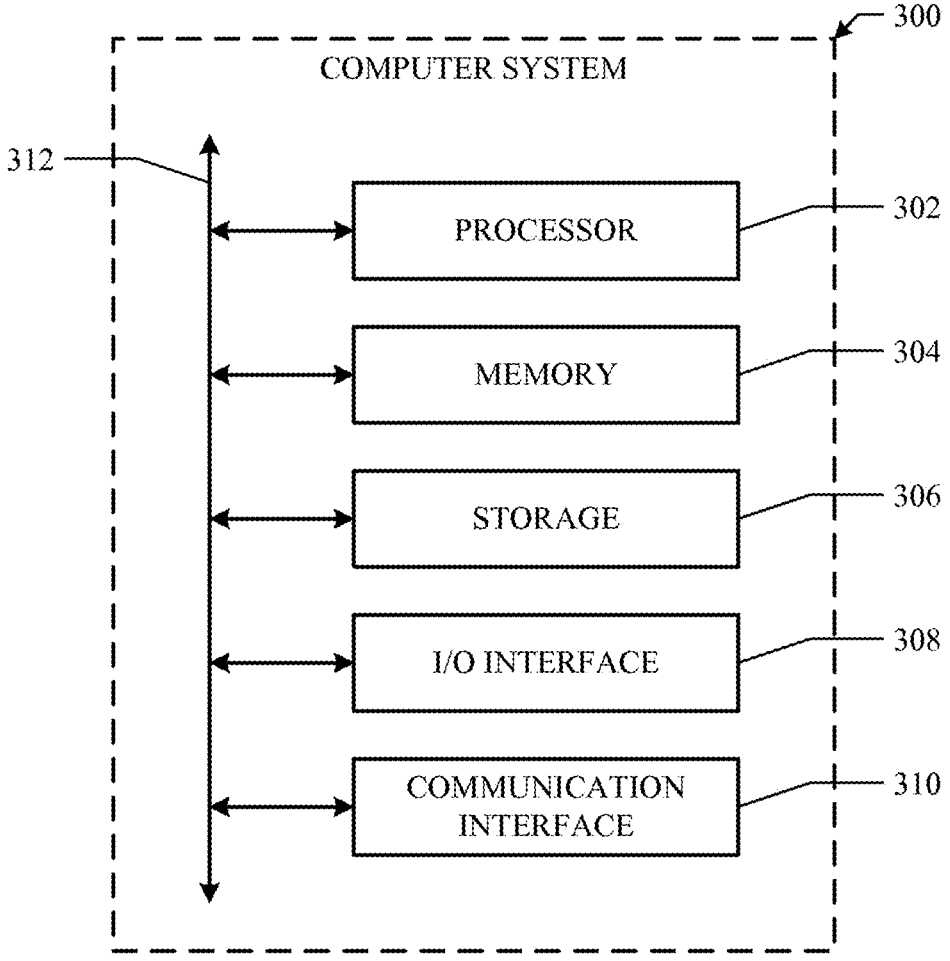
FIG. 3 illustrates an example computing device.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
accessing an image captured by an imaging system comprising an aperture and an optical sensor, wherein the imaging system blurs the image;
determining an Airy-disk correction that attributes at least part of the blurring in the image to a circular aperture rather than to a pinhole aperture, comprising:
determining an inverse kernel for the image, wherein the inverse kernel attributes blurring in the image to a pinhole aperture;

updating the inverse kernel to attribute blurring in the image to a circular aperture rather than to a pinhole aperture;
using the updated inverse kernel to determine the Airy-disk correction; and
generating a deblurred image by applying the determined Airy-disk correction to the accessed image.

2. The method of claim 1, wherein updating the inverse kernel comprises:
determining a Fourier-space representation H of a point-spread function for the imaging system that attributes blurring to a pinhole aperture;
determining a Fourier-space representation K of a point-spread function for the imaging system that attributes blurring to a circular aperture; and
determining a Fourier-space representation of de-blurred image based on: (1) convolving H and K, and (2) the accessed image captured by the imaging system.

3. The method of claim 1, further comprising:
converting the image to plurality of image channels, wherein one of the plurality of channels represents a luminance of the image; and
de-blurring the image by applying the Airy-disk correction only to the luminance channel.

4. The method of claim 3, further comprising:
one or more of:
determining whether a point-spread function (PSF) for each of a plurality of color channels are equivalent to each other; or
determining whether the PSF for each of the plurality of color channels are similar to each other and there are no significant artifacts or loss of image quality in the recovered image; and
in response to the one or more determinations, then de-blurring the image by applying the Airy-disk correction only to the luminance channel.

5. The method of claim 4, further comprising:
determining that the edges in an image corresponding to a first color channel align with the edges in an image corresponding to a second color channel; and
in response to the determination, then de-blurring the image by applying the Airy-disk correction only to the luminance channel.

6. The method of claim 1, wherein the imaging system is integrated into a client computing device.

7. The method of claim 6, wherein the client computing device comprises a smartphone.

8. The method of claim 6, wherein the imaging system is disposed behind a display of the client computing device.

9. A system comprising one or more processors and a non-transitory computer readable storage media embodying instructions coupled to the one or more processors, the one or more processors operable to execute the instructions to:
access an image captured by an imaging system comprising an aperture and an optical sensor, wherein the imaging system blurs the image; and
determine an Airy-disk correction that attributes at least part of the blurring in the image to a circular aperture rather than to a pinhole aperture, comprising:
determining an inverse kernel for the image, wherein the inverse kernel attributes blurring in the image to a pinhole aperture;
updating the inverse kernel to attribute blurring in the image to a circular aperture rather than to a pinhole aperture;
using the updated inverse kernel to determine the Airy-disk correction; and generate a deblurred image by applying the determined Airy-disk correction to the accessed image.

10. The system of claim 9, wherein updating the inverse kernel comprises:

determining a Fourier-space representation H of a point-spread function for the imaging system that attributes blurring to a pinhole aperture;

determining a Fourier-space representation K of a point-spread function for the imaging system that attributes blurring to a circular aperture; and determining a Fourier-space representation of de-blurred image based on: (1) convolving H and K, and (2) the accessed image captured by the imaging system.

11. The system of claim 9, wherein the one or more processors are further operable to execute the instructions to:

convert the image to plurality of image channels, wherein one of the plurality of channels represents a luminance of the image; and de-blur the image by applying the Airy-disk correction only to the luminance channel.

12. The system of claim 11, wherein the one or more processors are further operable to execute the instructions to:

one or more of:

determine whether a point-spread function (PSF) for each of a plurality of color channels are equivalent to each other; or determine whether the PSF for each of the plurality of color channels are similar to each other and there are no significant artifacts or loss of image quality in the recovered image; and in response to the one or more determinations, then de-blur the image by applying the Airy-disk correction only to the luminance channel.

13. The system of claim 12, wherein the one or more processors are further operable to execute the instructions to:

determine that the edges in an image corresponding to a first color channel align with the edges in an image corresponding to a second color channel; and in response to the determination, then de-blur the image by applying the Airy-disk correction only to the luminance channel.

14. The system of claim 9, wherein the imaging system is integrated into a client computing device.

15. The system of claim 14, wherein the client computing device comprises a smartphone.

16. The system of claim 14, wherein the imaging system is disposed behind a display of the client computing device.

17. One or more non-transitory computer readable storage media embodying instructions and coupled to one or more processors that are operable to execute the instructions to:

access an image captured by an imaging system comprising an aperture and an optical sensor, wherein the imaging system blurs the image; and determine an Airy-disk correction that attributes at least part of the blurring in the image to a circular aperture rather than to a pinhole aperture, comprising:

determining an inverse kernel for the image, wherein the inverse kernel attributes blurring in the image to a pinhole aperture;

updating the inverse kernel to attribute blurring in the image to a circular aperture rather than to a pinhole aperture;

using the updated inverse kernel to determine the Airy-disk correction; and generate a deblurred image by applying the determined Airy-disk correction to the accessed image.

18. The media of claim 17, wherein updating the inverse kernel comprises:

determining a Fourier-space representation H of a point-spread function for the imaging system that attributes blurring to a pinhole aperture;

determining a Fourier-space representation K of a point-spread function for the imaging system that attributes blurring to a circular aperture; and determining a Fourier-space representation of de-blurred image based on: (1) convolving H and K, and (2) the accessed image captured by the imaging system.

19. The media of claim 17, wherein the imaging system is integrated into a client computing device.

20. The media of claim 19, wherein the imaging system is disposed behind a display of the client computing device.

\* \* \* \* \*